United States Patent [19]

Majewski et al.

[11] Patent Number: 5,126,421
[45] Date of Patent: Jun. 30, 1992

[54] CURING SYSTEM FOR ISOCYANATE PREPOLYMERS

[75] Inventors: Witek Majewski; Hamdy Khalil; Jerzy Wypych, all of Ontario, Canada

[73] Assignee: 501 Tremco Ltd., Beachwood, Ohio

[21] Appl. No.: 516,032

[22] Filed: Apr. 27, 1990

[51] Int. Cl.$^5$ .............................................. C08G 18/10
[52] U.S. Cl. ......................................... 528/44; 528/49; 528/59; 428/65; 427/288.2
[58] Field of Search ............... 528/44, 49, 59; 428/65; 427/388.2; 524/13; 523/414

[56] References Cited

U.S. PATENT DOCUMENTS

| | | | |
|---|---|---|---|
| 3,436,367 | 4/1969 | McInerney | 427/388.2 |
| 3,549,571 | 12/1970 | Berg et al. | 524/13 |
| 3,661,923 | 5/1972 | Emmons et al. | 548/215 |
| 3,743,626 | 7/1973 | Emmons et al. | 428/65 |
| 4,002,601 | 1/1977 | Hajek et al. | 528/49 |
| 4,002,637 | 1/1977 | Lewis et al. | 548/215 |
| 4,101,527 | 7/1978 | Cunningham et al. | 528/73 |
| 4,118,376 | 10/1978 | Pedain et al. | 528/59 |
| 4,381,388 | 4/1983 | Naples | 528/59 |
| 4,751,257 | 6/1988 | Tominaga | 523/414 |

*Primary Examiner*—John Kight, III
*Assistant Examiner*—Duc Truong
*Attorney, Agent, or Firm*—Weston, Hurd, Fallon, Paisley & Howley

[57] ABSTRACT

Isocyanate prepolymer compositions can be cured quickly and thoroughly in the presence of atmospheric moisture by reacting them with a curing system that includes a mixture of (1) an oxazolidine moisture scavenger and curing agent and (2) a hydroxyl curing agent. The oxazolidine moisture scavenger/curing agent can be monocyclic oxazolidine or bicyclic oxazolidine. The hydroxyl curing agent preferably is a polyhydric compound. If desired, an organic solvent, a catalyst, and/or fillers can be used with the invention in order to speed the curing reaction or improve the physical and mechanical properties of the final polymer product. The present invention enables high quality polyurethane/polyurea polymers to be formed in thick layers under various environmental conditions, including humidity, that render the invention suitable for use in the field.

40 Claims, No Drawings

CURING SYSTEM FOR ISOCYANATE PREPOLYMERS

BACKGROUND OF THE INVENTION

1. Field of the Invention.

The invention relates to isocyanate prepolymer compositions that can be cured quickly, and thoroughly, in the presence of atmospheric moisture.

2. Description of the Prior Art.

As used herein, "isocyanate prepolymers" means compounds having at least two isocyanate groups which yield urethane and/or urea linkages upon curing to form the final polymeric product. The reaction of isocyanate prepolymers with active hydrogen compounds such as amines or hydroxyl groups, such as alcohols, to form polyureas or polyurethanes is well known and has been utilized to produce two-component, chemically curing, polymer systems. "Two-component systems" are those where two separate components are mixed immediately before application. As used herein, the term "hydroxyl curing system" refers to a reaction between an isocyanate and a hydroxyl group to produce a polyurethane polymer. As used herein, the term "amine curing system" refers to a reaction between an isocyanate and an amine group to produce a polyurea polymer.

One of the disadvantages of an amine curing system is the extremely high reactivity of isocyanates, particularly aromatic isocyanates, towards amine groups. As a result, amine curing systems react so rapidly that they can be used only in certain technologies like reaction injection moulding or spraycoating.

A disadvantage of a hydroxyl curing system is the chemical similarity between the hydroxyl group of the hydroxyl curing system and the hydroxyl group in water. This results in competition between the water and alcohol for the isocyanate groups; as a consequence, moisture can effectively inhibit the curing process. An additional problem with curing isocyanate prepolymers is that the isocyanates react readily with moisture to yield carbon dioxide which causes bubble formation in the polymeric product. The presence of bubbles reduces the structural integrity of the finished product. Consequently, a hydroxyl curing system can be utilized successfully only in a controlled environment in which the atmospheric moisture is significantly reduced, or essentially eliminated. Accordingly, a hydroxyl curing system is not well suited for use in the field.

Another group of compounds used for cross-linking or curing polyisocyanates is oxazolidines. As used herein, the term "oxazolidine curing system" refers to a reaction between an isocyanate and a hydroxylamine, the reaction product of oxazolidine and water, to produce a cross-linked polymer. Oxazolidine reacts with water, such as atmospheric moisture, to yield hydroxylamine. The amine group of such hydroxylamine reacts with the isocyanate group to yield (1) a polymer of high molecular weight or (2) cross-linked polymers. The hydroxyl group of such hydroxylamine may also react with the isocyanate group to yield polyurethane polymers or cross-linked polymers.

The use of oxazolidines as polyurethane/polyurea curing agents has been described in the following patents: U.S. Pat. Nos.: 3,661,923; 3,743,626; 4,002,601; 4,002,637; 4,101,527; 4,118,376; 4,381,388; and 4,751,257.

A difficulty with oxazolidine curing systems is that they require moisture to release the hydroxylamine. The cure will slow or stop when the moisture source no longer is available, often leaving unreacted components. In oxazolidine curing systems, the curing process progresses inwardly from the surface of the composition that is exposed to the moisture. A tough, impermeable skin of the cured material forms on the exterior surface. Once this skin is formed, it is usually too dense to permit further water penetration into the inner, deeper layers of the composition. Consequently, the curing process slows and may eventually stop. Oxazolidine-cured compositions may attain their ultimate strength, if at all, only after weeks or months. Indeed, under some unfavorable conditions such as low humidity and/or high temperature, such compositions may never completely cure or develop their desired physical or mechanical properties. The disadvantages of oxazolidine curing systems are aggravated as the thickness of composition is increased.

In addition to the above-described problems, the aromatic isocyanate polyurethane prepolymers are, due to their high reactivity, more prone to various side reactions which compete with the designed curing process. The skin formation, by reducing the penetration of atmospheric moisture, slows the curing process underneath the skin; this in turn, further favors these undesirable side reactions.

In view of the foregoing problems, neither a hydroxyl curing agent alone nor an oxazolidine curing agent alone can be used for products such as paints, protective coatings, waterproofing materials, sealants and caulks which are to be applied in a variety of non-controlled environments by individuals with varying technical skills, without being subject to these various drawbacks.

Desirably, a curing system would be available that would avoid the drawbacks of a hydroxyl curing system and an oxazolidine curing system. Specifically, any such curing system should function well even in the presence of atmospheric moisture, and it should completely cure despite the formation of a skin layer. The curing system also should provide a complete and rapid cure throughout the thickness of the composition without undesired side reactions occurring.

SUMMARY OF THE INVENTION

The present invention overcomes the foregoing drawbacks of the prior art and provides a new and improved polymerizable composition comprising an isocyanate prepolymer and a curing system. The curing system comprises a mixture of a hydroxyl curing agent, preferably a polyhydric compound, and a moisture scavenger/curing agent, preferably an oxazolidine. As used herein, "polyhydric compound" means a compound having more than one hydroxyl group. As used herein, "moisture scavenger" means that the compound binds atmospheric moisture from its surroundings.

Several inventions are contained herein:

1. A curing system according to the invention comprises the following materials by weight percent:
   20%–90% polyhydric compound; and
   10%–80% oxazolidine.

2. A composition according to the invention comprises the following materials by weight percent:
   5%–95% isocyanate prepolymer; and
   5%–95% curing system including a polyhydric compound and an oxazolidine.

3. A process for forming a polyurethane/polyurea polymeric product made by reacting:
   5%–95% isocyanate prepolymer; and
   5%–95% curing system including a polyhydric compound and an oxazolidine.

4. A polyurethane/polyurea polymeric product made by the above-mentioned process.

The resulting composition will cure quickly and thoroughly in the presence of atmospheric moisture, within a range of temperature (20° C. to 50° C.), to yield a mixed polyurea or polyurethane polymer which is suitable for thick-layer (up to 1 inch) application in the field. If desired, optional components such as a solvent, a catalyst and one or more fillers can be used to speed the curing reaction and improve the physical and mechanical properties of the cured product.

DESCRIPTION OF THE PREFERRED EMBODIMENT

A good-quality, working, mixed polyurethane/polyurea polymer system suitable for application in thick layers (up to 1 inch) can be obtained by using a curing system comprising a mixture of a hydroxyl curing agent and a moisture scavenger/curing agent in one composition. The composition cures quickly (within about 24 hours) and thoroughly; that is, it cures to a solid polymer which exhibits the desired mechanical and physical properties. The present invention provides an improved polymerizable composition, comprising an isocyanate prepolymer and a curing system that includes a hydroxyl curing agent, preferably a polyhydric compound, and a moisture scavenger/curing agent, preferably an oxazolidine. If desired, the invention further comprises a solvent, preferably an organic solvent, a filler and a catalyst.

THE ISOCYANATE PREPOLYMER

The isocyanate prepolymer can be an aliphatic, cycloaliphatic, or aromatic isocyanate. In general, any well-known polyisocyanate can be used with the invention.

Typical aliphatic isocyanates usable with the invention include 1,6-hexamethylene diisocyanate, 1,8-octamethylene diisocyanate, meta and para-tetramethyl xylene diisocyanates. Typical cycloaliphatic isocyanates usable with the invention include BIS(4-isocyanato cyclohexyl) methane, isophorone diisocyanate ("IPDI"), and isophorone diisocyanate trimer. Typical aromatic isocyanates usable with the invention include 4,4$^1$-diphenylmethane diisocyanate ("MDI"), the polymeric isocyanates based on MDI, toluene diisocyanate ("TDI"), and naphtalene diisocyanate.

The polyisocyanates used as the isocyanate prepolymer also can be prepared in the form of a prepolymer by reacting hydroxyl compounds, such as polyols, with the isocyanates referred to above. The most important requirement of any such prepolymer is that it contain active isocyanate groups. Techniques for preparing various isocyanate prepolymers can be found in various sources, for example, Sanders & Frisch, "Polyurethanes: Chemistry and Technology," InterScience, New York (1964).

The selection of the particular isocyanate prepolymer is determined by the physical and/or mechanical properties that are desired in the resulting polymer. If the final polymer product is to be a sealant, then it needs to be elastomeric; if the final polymeric product is to be a protective coating, it must be tough and less flexible. Thus, for instance, prepolymers usually suitable for caulks and sealants utilize higher molecular weight polyols (1000 molecular weight and higher) selected from such groups as polyoxypropylene glycols and triols polytetramethylene diols or others. Prepolymers for coatings usually utilize lower molecular weight polyols (2000 molecular weight or less) with an increased amount of triol components. Polyols for coatings are usually selected from polyoxypropylene polyols, polytetramethylene, glycols, polycaprolactones, different polyester polyols or ethers, and less common groups.

The following examples are designed to obtain an isocyanate prepolymer that will be incorporated into a final polymeric product suitable as a protective coating; however, the present invention will apply equally well to compositions that produce more elastomeric products. Various mixtures of different isocyanate prepolymers may be used.

EXAMPLE 1

795 grams (g.) of polycaprolactone diol commercially available as Tone 201 (from Union Carbide); and 825 g. of 4,4 diphenylmethane diisocyanate commercially available as Rubinate 44 (from ICI); and 180 g. of xylene were charged into a glass reactor equipped with a stirrer, temperature sensor, and placed in a heating mantle. The contents of the reactor were under a nitrogen blanket, in order to provide an inert environment. During the reaction, the temperature was raised to 90° C. After one-half hour at this temperature, the product was cooled to room temperature. The resulting prepolymer had 8.1% of free isocyanates and a viscosity of 12,940 centipoises (cps).

EXAMPLE 2

1000 g. of Poly G20-112, a polyoxypropylene glycol available from Olin; 525 g. of Rubinate 44; and 170 g. of xylene were mixed in a glass reactor as in Example 1. The reaction was carried out for 2 hours at 90° C. The resulting prepolymer had 5.2% of isocyanate groups and a viscosity of 4,400 cPs.

EXAMPLE 3

1180 g. of Poly G30-112, a poloxypropylene triol available from Olin; 620 g. of Rubinate 44; and 200 g. of xylene were mixed as described in Example 1. The reaction was carried out for 2 hours at 85° C. The resulting prepolymer had approximately 5.26% of free isocyanates and a viscosity of 30,000 cPs.

EXAMPLE 4

1298 g. of polytetramethylene glycol commercially available as Polymeg 1000 from Q. O. Chemicals; 649 g. of Mondur M (pure 4,4' diphenylmethane diisocyanate from Bayer); and 216 g. of xylene were mixed as described in Example 1. The reaction was carried out for 1 hour at 90° C. The resulting prepolymer contained 4.2% of free isocyanates and a viscosity of 12,000 cPs.

EXAMPLE 5

5: 431 g. of Tone 201 polycaprolactone diol; 564 g. of Mondur M; 519 g. of Poly G20-112 polyoxypropylene glycol; and 267 g. of xylene were mixed as described in Example 1. The reaction was carried out for 4 hours at 71° C. The resulting prepolymer had 4.34% of free isocyanates and a viscosity of 8,400 centipoises.

EXAMPLE 6

321 g. of Tone 201; 590 g. of Mondur M; 430 g. of Poly G20-112; and 146 g. of Shellsol 16, an aliphatic hydrocarbon solvent from Shell, were mixed and reacted as described in Example 1. The reaction was carried out for 4 hours at 71° C. The resulting prepolymer had 7.5% free isocyanates and a viscosity of 5,900 cPs.

EXAMPLE 7

292 g. of Tone 201; 536 g. of Mondur M; 405 g. of PPG 1025 polyoxypropylene diol available from Union Carbide; 135 g. of Shellsol 16; and 135 g. of Solvesso 100, an aromatic hydrocarbon solvent available from Imperial Oil, were mixed as described in Example 1. The reaction was carried out for 1½ hours at 85°-89° C. The resulting prepolymer had 6.38% isocyanate groups and a viscosity of 2,800 cPs.

EXAMPLE 8

1000 g. of Polymeg 1000 polytetramethylene glycol; 525 g. of Rubinate 44; 190 g. of Solvesso 100; and 190 g. Shellsol 16 were mixed as described in Example 1. The reaction was carried out for 3 hours at 70° C. The resulting prepolymer had 4.52% of isocyanates and a viscosity of 4,200 cPs.

EXAMPLE 9

750 of Polymeg 1000; 6.8 g. of 2-ethyl-2-(hydroxymethyl)-1,3-propanediol (trimethylolpropane, TMP); 536 g. of Mondur M; 240 g. of Solvesso 100, 79 g. of PM Acetate, available as Arcosolv PMA from ARCO, were mixed as described in Example 1. The reaction was carried on for 1 hour at 90° C. The resulting prepolymer had 6.48% of isocyanates and a viscosity of 1,800 cPs.

The Curing System

The curing system is a mixture of two components. The first component of the curing system is a hydroxyl compound, preferably a polyhydric compound. The second component is an oxazolidine or a mixture of several oxazolidines.

The Curing Process

Shortly before application, the curing system is mixed with the desired isocyanate prepolymer. As a result of the atmospheric moisture reacting with oxazolidine, the oxazolidine is hydrolyzed and a hydroxylamine is formed. The hydroxylamine is reactive with the isocyanate groups of the isocyanate prepolymer and is incorporated into the final polymeric structure.

The curing activity of the oxazolidine results in a fast exterior skin formation. Because of the skin's low moisture permeability, the skin reduces the absorption of atmospheric moisture. Furthermore, the oxazolidine scavenges the remaining moisture within the composition, further reducing or eliminating the water content of the composition. As the water content of the composition decreases, the competition for the isocyanate is reduced which permits the hydroxyl cure to proceed on its own without deleterious interference from moisture.

The hydroxyl curing process is accomplished by the hydroxyl groups of the hydroxyl curing agent (such as polyfunctional alcohols) reacting with the free isocyanate groups of the isocyanate prepolymers. This results in a polyurethane in which the hydroxyl curing agent has been incorporated. Since the environment below the skin contains little or no water due to the moisture scavenging of the oxazolidine, the hydroxyl cure will proceed to completion. As a result, essentially all of the composition is cured. This curing system can be used by non-highly skilled individuals in an essentially non-controlled environment in which atmospheric water is present.

The selection of the hydroxyl curing agent depends on the desired characteristics of the final polymeric product. If the end product is a sealant, it needs to be elastomeric, that is, the modulus of elasticity should be low (about 3 megapascals or lower). If the product is to be a protective coating, it needs to be tough, that is, the modulus of elasticity should be high about 15 megapascals or higher). Selection of a high molecular weight (above around 1000) hydroxyl curing agent, used with a properly formulated prepolymer will produce a polymer with a low modulus of elasticity. Conversely, a low molecular weight (below 400) hydroxyl curing agent with properly formulated prepolymer will yield a product with a higher modulus of elasticity. Another factor affecting the selection of the hydroxyl curing agent is the structure of the hydroxyl curing agent, including the linearity, the number and the type of functional groups and hetero atoms.

Various hydroxyl curing agents or mixtures thereof may be used depending on the desired physical and mechanical properties of the final polymeric product. Typical suitable hydroxyl curing agents include glycols, such as ethylene glycol, 1,4 butanediol, polyols, trimethylolpropane, polyether polyols, polyester polyols, polycaprolactone diol, polycaprolactone triol, and other modified polyhyric compounds for example N,N,N',N'-tetrakis-[2-hydroxypropyl]-ethylenediamine, polycaprolactone diol, polycaprolactone triol, and trimethylolpropane. Mixtures of the hydroxyl curing agent also may be employed. Virtually any oxazolidine may be used; the oxazolidine may be either a monocylic oxazolidine or a bicyclic oxazolidine. The oxazolidine can be obtained from polymers or oligomers having inherent oxazolidine functionalities. Monocylic oxazolidines have the general structure:

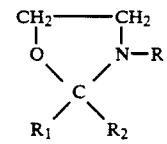

where
R = contains at least 1 carbon atom and may be a substituted or unsubstituted oligomeric or polymeric chain
$R_1$ = hydrogen, aliphatic, or aromatic groups
$R_2$ = hydrogen, aliphatic, or aromatic groups
Bicyclic oxazolidines have the general structure:

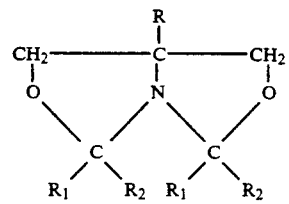

where

R = contains at least 1 carbon atom and may be a substituted or unsubstituted oligomeric or polymeric chain R$_1$ = hydrogen, aliphatic, or aromatic groups R$_2$ = hydrogen, aliphatic, or aromatic groups Selection of the oxazolidine will depend on the characteristics that are defined in the final polymer product. Use of bicyclic oxazolidine, rather than monocyclic oxazolidine, will give a tougher final product since the functionality, that is, number of reactive sites, is higher. Good results have been obtained using a monocyclic oxazolidine commercially marketed under the trade mark HARDENER OZ, available from Bayer.

Optional Components

Catalysts

A catalyst will speed the curing reaction between the hydroxyl groups of the hydroxyl curing agent and the isocyanate groups of the isocyanate prepolymers. However, good results have been obtained without using a catalyst. Catalysts well known in the art and suitable for use with the present invention are the organic tertiary amine compounds and metal-based catalysts, preferably the organo-metallic compounds such as organo-tin, organo-lead, and organo-bismuth catalysts. Good results have been obtained using dibutyl tin dilaurate, commercially available as Formrez SUL 4, from Witco, and an organo-bismuth catalyst commercially available as Coscat 83 from Cosan. The oxazolidine hydrolysis may be catalized using: organic or inorganic acids, acid anhydrides or acid chlorides. Particularly good results have been obtained using a fatty acid anhydride, known as Hardener M from Bayer.

Fillers

Although not a requirement of the invention, various fillers such as calcium carbonate, clay (such as Lomax LL, commercially available from Georgia Kaolin Co.), and titanium dioxide may be added to improve the color and hiding properties of the final polymer product and for cost considerations.

The Solvent

Virtually an solvent capable of dissolving the isocyanate prepolymer is suitable. Good results have been obtained using PM Acetate, xylene, ethyl 3-ethoxy propylene commercially available as EEP ester (from Union Carbide), aliphatic hydrocarbon solvents such as Shellsol 16 available from Shell, and aromatic hydrocarbon solvents such as Solvesso 100 available from Imperial Oil.

Compatabilizer

A compatabilizer such as N,N,N',N'-tetrakis-[2-hydroxypropyl]-ethylenediamine may be used to provide a homogenous mixture of the hydroxyl curing agent with the isocyanate prepolymer. For example, use of 1,4 butanediol as the sole hydroxyl curing agent results in a product with a non-uniform cloudiness or opacity, which may not be desirable. Addition of the N,N,N',N'-tetrakis-[2 hydroxypropyl]-ethylenediamine, commercially available as Quadrol from BASF, results in a product with good mechanical and physical properties, but without the opacity.

The hydroxyl curing agent should constitute about 20% to 90% (mole %) of the total curing agent, the remainder being oxazolidine. The amount of oxazolidine to be used largely depends on the humidity. The greater the humidity, the more oxazolidine is needed to scavenge water. Preferably oxazolidine constitutes about 20% to 50% (mole %) of the total curing agent.

Preparing the Composition

The isocyanate prepolymer is mixed with the solvent, the oxazolidine moisture scavenger/curing agent and the hydroxyl curing agent and, if desired, a catalyst and a solvent. The following examples illustrate some different combinations of the components and the preparation of the composition.

EXAMPLE 10

50 g. of the prepolymer used in Example 1, 50 g. of the prepolymer obtained in Example 2, 10 g. of xylene, 0.02 millimeters (ml.) of a 20% solution of Coscat 83 in PM Acetate, 8.8 g. of HARDENER OZ and 3.25 g. of 1,4 butanediol were blended. The mixture was dearated under vacuum, then cast on a glass, flat surface covered with a release film. Hereinafter this will be referred to as being "cast in the standard way." The next day the cured samples were slightly opaque but the film had a consistent thickness, good appearance and appeared uniform. After completing the cure for 2 weeks (as per A.S.T.M. C 957 standard procedure) at room temperature followed by one week in an oven at 55° C., the tensile properties were tested. The results were tensile strength at break 31 megapascals (MPa), strain at break 315%.

To illustrate the importance of the hydroxyl curing agent, the following two examples were done in which the hydroxyl curing agent was omitted.

EXAMPLE 11

100 g. of the isocyanate prepolymer from Example 1 was mixed with 10 g. of xylene, 21 g. of HARDENER OZ and 0.02 ml. of Coscat 83 (20% solution in PM Acetate). The mixture was reacted under vacuum, then cast on a flat surface covered with a release film. The sample thickness was about 2 ml. The next day the sample was partially cured. A tough skin was developed on the surface and a liquid mixture remained underneath. The surface skin was wrinkled and non-uniform.

This example demonstrates the drawbacks of using oxazolidine as the sole curing agent.

EXAMPLE 12

50 g. of the isocyanate prepolymer from Example 2 was mixed with 50 g. of the prepolymer from Example 11, 10 g. of xylene, 17.6 g. of HARDENER OZ and 0.02 ml. of a 20% solution of Coscat 83. The mixture was cast onto a flat surface as in Example 1. The next day the cured material exhibited a very poor appearance, bubbles, and a non-uniform cure.

EXAMPLE 13

80 g. of the isocyanate prepolymer from Example 4 was blended with 20 g. of the prepolymer in Example 3 and 5.3 g. of HARDENER OZ, 2.95 g. of 1,4 butanediol, 15 g. of xylene and 0.005 ml. of Coscat 83 (20% solution in PM Acetate) were added. The mixture was cast in the standard way. The resulting film was strong, slightly opaque and looked uniform. After completion of the cure, the tensile properties were tested. The results were tensile strength at break 26 MPa, strain at break 478%, and tear strength 41.5 newtons/millimeter (N/mm).

EXAMPLE 14

50 g. of the isocyanate prepolymer from Example 5 were blended with 3 g. of HARDENER OZ and 3.6 g. of Quadrol (N,N,N',N'-tetrakis-(2-hydroxypropyl)-ethylenediamine). The mixture was cast in the standard way. The resulting film was strong, transparent and, after completion of the cure, the tensile properties were tensile strength at break 31 MPa and strain at break 323%.

EXAMPLE 15

50 g. of the isocyanate prepolymer from Example 5 were blended with 2.4 g. of HARDENER OZ, 0.65 g. of 1,4 butanediol, 1.1 g. of Quadrol, and 0.02 ml. of COSCAT 83 (10% solution in PM Acetate). The mixture was cast in the standard way. The resulting film was slightly opaque and after cure completion, the tensile properties were strength at break 22 MPa and strain at break 350%.

EXAMPLE 16

50 g. of the isocyanate prepolymer from Example 6 were mixed with 2.05 g. of HARDENER OZ, 0.54 gram of trimethylolpropane, 2.1 g. of 1,4-butanediol, 0.54 gram of PM Acetate, 15 g. of xylene, and 0.005 ml. of COSCAT 83 (20% solution in PM Acetate). The resulting mixture was cast in the standard way. The cured film was slightly opaque. After completion of the cure, the tensile properties were determined to be: tensile strength at break 30 MPa; strain at break 316%; and tear strength 70N/mm.

EXAMPLE 17

100 g. of the isocyanate prepolymer from Example 4 were blended with 5.3 g. of HARDENER OZ, 0.6 gram of trimethylolpropane, 2.34 g. of 1,4-butanediol, 0.6 gram of PM Acetate, and 15 g. of xylene. The mixture was cast in the standard way. The resulting cured film was slightly opaque and after completion of the cure, the tensile properties were established to be: tensile strength at break 21.3 MPa; strain at break 596%; and tear strength at 52N/mm.

To demonstrate the importance of the oxazolidine component in the curing system, the following experiments were done in which oxazolidine was omitted.

Example 18

Two samples were prepared:

A. 50.0 g. of the isocyanate prepolymer from Example 7 were mixed with 1.95 g. of Tone 201, and 3.0 g. of 1,4-butanediol.

B. 50 g. of the isocyanate prepolymer from Example 7 were mixed with 2.8 g. of 1,4-butanediol, 2.0 g. of Tone 305 (polycaprolactone triol), and 5.0 g. of xylene.

Both samples were cast in the standard way. After 24 and 48 hours, both samples appeared satisfactory in that they appeared uniform, although they were opaque. However, upon completion of the cure, both samples exhibited severe cracking to such an extent that the determination of the tensile properties was not possible. As noted in the following examples, addition of oxazolidine resulted in a suitable polymeric product.

This example demonstrates the drawback in using hydroxy curing agent alone.

EXAMPLE 19

A similar composition as in the previous example was prepared, but with addition of oxazolidine in the form of HARDENER OZ. 50 g. of the prepolymer from Example 7 were mixed with 1.95 g. of Tone 201, 2.50 g. of 1.4-butanediol, and 1.34 g. of HARDENER OZ. The mixture was cast in the standard way. The resulting film was strong, consistent, slightly opaque and remained strong, without any cracking upon completion of the cure.

Example 20

A curing agent first was prepared by mixing 32 g. of HARDENER OZ, 24.4 g. of 1,4-butanediol, 3.7 g. of EEP ester, 22.6 g. of Tone 201, and 14.5 g. of Solvesso 100. The resulting curing agent was a clear, slightly yellowish, transparent liquid. 50 g. of the isocyanate prepolymer from Example 8 were mixed with 5.1 g. of the curing agent described above and 3 g. of Solvesso 100. The mixture was cast in the standard way. The resulting film was tested after completion of the cure. The tensile strength at break was 23.1 MPa and the strain at break was 610%.

EXAMPLE 21

A curing agent was prepared by mixing 22.8 g. of HARDENER OZ, 8.4 g. of 1.4-butanediol, 8.0 g. of Quadrol; 26.5 g. of PM Acetate, 14 g. of Tone 201, 30 g. of Solvesso 100, 1.5 g. of calcium carbonate, 40 g. of clay, and 4.0 g. of titanium dioxide. 25 g. of the isocyanate prepolymer from Example 9 were mixed with 16 g. of the curing agent described above. The mixture was cast in the standard way. The resulting film was strong and uniform. Upon completion of the cure, the tensile properties were determined. The results of the test were tensile strength at break 20.3 MPa; strain at break 222%; and tear strength 42N/mm.

Example 22

The curing agent was prepared as per example number 21. 50 g. of the prepolymer were mixed with 41.7 g. of the curing agent. Additionally, one g. of HARDENER H (Bayer) was added to the mixture. The mixed composition was cast in the standard way. The resulting film was strong and uniform. Upon completion of the cure, the tensile properties were determined. The results of the test were tensile strength at break 24 MPa; and strain at break 270%.

While several embodiments of the invention have been shown and described, various adaptations and modifications can be made by one skilled in the art without departing from the scope of the invention as defined in the appended claims.

What is claimed is:

1. A polymerizable composition, comprising:
   an isocyanate prepolymer;
   a curing system including a hydroxyl curing agent and an oxazolidine moisture scavenger/curing agent.

2. A composition according to claim 1, wherein the hydroxyl curing agent is a polyhydric compound.

3. A composition according to claim 1, wherein the hydroxyl curing agent is selected from the group consisting of 1,4 butanediol, N,N,N',N'-tetrakis-[2-hydroxypropyl]-ethylenediamine, polycaprolactone diol, polycaprolactone triol, trimethylolpropane, and mixtures thereof.

4. A composition according to claim 1, wherein the oxazolidine moisture scavenger/curing agent is a monocyclic oxazolidine.

5. A composition according to claim 1, wherein the oxazolidine moisture scavenger/curing agent is a bicyclic oxazolidine.

6. A composition according to claim 1, wherein the isocyanate prepolymer has about 1% to 50% by weight free isocyanate groups.

7. A composition according to claim 1, wherein the isocyanate prepolymer is a product obtained by reacting 4,4' diphenylmethane diisocyanate with a polyol selected from the group consisting of polytetramethylene glycol, polycaproactone diol, polyoxypropylene glycol, trimethylolpropane, and mixtures thereof.

8. A composition according to claim 1, further comprising a catalyst.

9. A composition according to claim 8, wherein the catalyst constitutes about 0% to about 1% of the total composition weight.

10. A composition according to claim 8, wherein the catalyst is selected from the group consisting of tertiary nitrogen compounds, organic tertiary amine compounds, organo-tin compounds, organo-lead compounds, organo-bismuth compounds, dialkyl tin salts of carboxylic acid, and dibutyl tin dilaurate.

11. A composition according to claim 10, wherein the catalyst is selected from the group consisting of organic or inorganic acids, acid anyhydrides or acid chlorides.

12. A composition according to claim 1, further comprising an organic solvent.

13. A composition according to claim 10, wherein the organic solvent is selected from the group consisting of PM Acetate, xylene, ethyl 3-ethoxypropylene, Shellsol 16, Solvesso 100, and mixtures thereof.

14. A composition according to claim 1, wherein the isocyanate prepolymer is present from about 10% to about 95% of the total composition weight.

15. The composition of claim 1, wherein the curing system constitutes about 5% to 95% of the total composition weight.

16. A composition according to claim 1, wherein the hydroxyl curing agent constitutes about 20% to about 90% of the total curing system weight.

17. A composition according to claim 1, wherein the oxazolidine moisture scavenger/curing agent constitutes about 10% to about 80% of the curing system weight.

18. A composition according to claim 1, further comprising a compatibilizer.

19. A composition according to claim 18, wherein the compatibilizer is N,N,N',N'-tetrakis-[2-hydroxypropyl]-ethylenediamine.

20. A curing system for curing an isocyanate prepolymer in the presence of atmospheric moisture, comprising a hydroxyl curing agent and an oxazolidine moisture scavenger/curing agent.

21. The curing system of claim 20, wherein the hydroxyl curing agent is a polyhydric compound.

22. The curing system of claim 21, wherein the polyhydric compound is selected from the group consisting of 1,4 butanediol, polycaprolactone diol, polycaprolactone triol, trimethylolpropane, and mixtures thereof.

23. The curing system of claim 20, wherein the oxazolidine moisture scavenger/curing agent is a monocyclic oxazolidine.

24. The curing system of claim 20, wherein the oxazolidine moisture scavenger/curing agent is a bicyclic oxazolidine.

25. The curing system of claim 20, wherein the oxazolidine moisture scavenger/curing agent constitutes about 10% to 80% of the total curing system weight.

26. The curing system of claim 20, wherein the hydroxyl curing agent constitutes about 20% to 90% of the total curing system weight.

27. The curing system of claim 20, further comprising a compatibilizer.

28. The curing system of claim 27, wherein the compatibilizer is N,N,N',N'-tetrakis-[2-hydroxypropyl]-ethylenediamine.

29. In a process for preparing a polymeric material by curing an isocyanate prepolymer, the improvement comprising:
reacting the isocyanate prepolymer with a curing system including oxazolidine and a hydroxyl compound.

30. The process of claim 29, wherein the oxazolidine is a monocyclic oxazolidine or a bicyclic oxazolidine, and the hydroxyl compound is a polyhydric compound.

31. The process of claim 29, wherein the polyhydric compound is selected from the group consisting of 1,4 butanediol, N,N,N',N'-tetrakis-[2-hydroxypropyl]-ethylenediamine, polycaprolactonediol, polycaprolactone triol, trimethylolpropane, and mixtures thereof.

32. The process of claim 29, further comprising the step of reacting the isocyanate prepolymer in the presence of a catalyst.

33. The process of claim 32, wherein the catalyst is selected from the group consisting of tertiary nitrogen compounds, organic tertiary amine compounds, organo-tin compounds, organo-lead compounds, organo-bismuth compounds, dialkyl tin salts of carboxylic acid, and dibutyl tin dilaurate.

34. The process of claim 32, wherein the catalyst is selected from the group consisting of organic or inorganic acids, acid anyhydrides or acid chlorides.

35. The process of claim 29, further comprising the step of reacting the isocyanate prepolymer and the curing system in an organic solvent.

36. The process of claim 35, wherein the organic solvent is selected from the group consisting of PM Acetate, xylene, ethyl 3-ethoxypropylene, Shellsol 16, Solvesso 100, and mixtures thereof.

37. The process of claim 29, further comprising a compatibilizer.

38. The process of claim 29, wherein the compatibilizer is N,N,N',N'-tetrakis-[2-hydroxypropyl]-ethylenediamine.

39. The process of claim 29, further comprising the step of exposing the reacted isocyanate prepolymer to atmospheric moisture.

40. The process of claim 29, comprising the polymeric material produced by reacting the isocyanate prepolymer with a curing system including oxazolidine and a hydroxyl compound.

* * * * *